(12) United States Patent
Mae et al.

(10) Patent No.: US 9,946,950 B2
(45) Date of Patent: Apr. 17, 2018

(54) DATA PROCESSING APPARATUS, DATA PROCESSING METHOD, AND PROGRAM

(71) Applicant: Oki Electric Industry Co., Ltd., Tokyo (JP)

(72) Inventors: Takahiro Mae, Tokyo (JP); Takamitsu Watanabe, Tokyo (JP); Takahiro Watanabe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 389 days.

(21) Appl. No.: 14/428,352

(22) PCT Filed: May 14, 2013

(86) PCT No.: PCT/JP2013/063446
§ 371 (c)(1),
(2) Date: Mar. 13, 2015

(87) PCT Pub. No.: WO2014/041848
PCT Pub. Date: Mar. 20, 2014

(65) Prior Publication Data
US 2015/0363659 A1    Dec. 17, 2015

(30) Foreign Application Priority Data

Sep. 14, 2012    (JP) .................................. 2012-202273

(51) Int. Cl.
*G06K 9/00*    (2006.01)
*G06K 9/46*    (2006.01)
(Continued)

(52) U.S. Cl.
CPC ........... *G06K 9/46* (2013.01); *G06K 9/00785* (2013.01); *G06K 9/4604* (2013.01); *G06K 9/52* (2013.01);
(Continued)

(58) Field of Classification Search
CPC ....... G06K 2009/4666; G06K 9/00785; G06K 9/46; G06K 9/4604; G06K 9/52;
(Continued)

(56) References Cited

U.S. PATENT DOCUMENTS

| | | | | |
|---|---|---|---|---|
| 5,473,931 A * | 12/1995 | Brady | .................. | G01B 11/022 340/937 |
| 7,038,577 B2 * | 5/2006 | Pawlicki | .................. | G06T 7/13 340/435 |
| 7,302,325 B2 * | 11/2007 | Kudo | ..................... | G08G 1/167 340/464 |
| 2005/0102070 A1 * | 5/2005 | Takahama | .............. | G01C 21/26 701/1 |
| 2007/0225895 A1 * | 9/2007 | Ma | ..................... | G06K 9/00785 701/117 |
| 2010/0001880 A1 * | 1/2010 | Kraft, IV | ......... | G08G 1/096716 340/905 |
| 2010/0019937 A1 * | 1/2010 | Mori | ........................ | G01S 1/70 340/936 |
| 2010/0110193 A1 * | 5/2010 | Kobayashi | ......... | G06K 9/00805 348/149 |

(Continued)

FOREIGN PATENT DOCUMENTS

| | | |
|---|---|---|
| JP | H09-212791 A | 8/1997 |
| JP | 2001-043483 A | 2/2001 |

(Continued)

*Primary Examiner* — Deidre Beasley
(74) *Attorney, Agent, or Firm* — Rabin & Berdo, P.C.

(57) ABSTRACT

An aspect of the present invention provides a data processing apparatus, including: an image acquisition section that acquires a captured image depicting a road along which vehicles pass; a calibration section that computes a road parameter for converting coordinates in the captured image to coordinates in real space based on the captured image and road data related to the road; a vehicle lane region detection section that detects a vehicle lane region in the captured image based on the captured image and the road parameter; and a processing region setting section that, based on the vehicle lane region, sets a processing region in the vehicle lane region for detecting a vehicle passing.

22 Claims, 12 Drawing Sheets

(51) Int. Cl.
- *G06K 9/52* (2006.01)
- *G06T 3/00* (2006.01)
- *G06T 7/00* (2017.01)
- *G08G 1/04* (2006.01)
- *G06T 7/80* (2017.01)

(52) U.S. Cl.
CPC ............... *G06T 3/00* (2013.01); *G06T 7/80* (2017.01); *G08G 1/04* (2013.01); *G06K 2009/4666* (2013.01); *G06T 2207/30232* (2013.01); *G06T 2207/30236* (2013.01); *G06T 2207/30242* (2013.01)

(58) Field of Classification Search
CPC . G06T 2207/30232; G06T 2207/30236; G06T 2207/30242; G06T 3/00; G06T 7/80; G08G 1/04
USPC ......................................................... 348/143
See application file for complete search history.

(56) References Cited

U.S. PATENT DOCUMENTS

| 2010/0322476 | A1* | 12/2010 | Kanhere | G08G 1/0175 |
| | | | | 382/103 |
| 2012/0148094 | A1* | 6/2012 | Huang | G06K 9/00785 |
| | | | | 382/103 |
| 2012/0296561 | A1* | 11/2012 | Park | G01C 21/3635 |
| | | | | 701/119 |

FOREIGN PATENT DOCUMENTS

| JP | 2005-062924 A | 3/2005 |
| JP | 2011-198030 A | 10/2011 |

* cited by examiner

FIG.12

| LANE | DISTANCE FROM INITIAL POSITION | AMOUNT OF DECREASE IN PRECISION |
|---|---|---|
| A | 0 m TO 2 m | 8% |
| | 2 m TO 5 m | 10% |
| | 5 m TO 10 m | 15% |
| | 10 m OR MORE | 25% |
| B | 0 m TO 2 m | 6% |
| | 2 m TO 5 m | 8% |
| | 5 m TO 10 m | 12% |
| | 10 m OR MORE | 20% |
| C | 0 m TO 2 m | 5% |
| | 2 m TO 5 m | 6% |
| | 5 m TO 10 m | 10% |
| | 10 m OR MORE | 15% |

DATA PROCESSING APPARATUS, DATA PROCESSING METHOD, AND PROGRAM

TECHNICAL FIELD

The present invention relates to a data processing apparatus, a data processing method, and a program.

BACKGROUND ART

Technology is known for measuring traffic volume based on a captured image from a monitoring camera, for example, as described in Japanese Patent Application Laid-Open (JP-A) No. 2011-198030 (Patent Document 1). In technology hitherto, calibration is first performed for a captured image. A road region is specified in the captured image by such calibration. Then a road parameter is computed to convert coordinates in the captured image to coordinates in real space. Then in technology hitherto, a vehicle lane region is detected in the captured image, and a processing region is set based on the vehicle lane region. The processing region is a region observed for the passing of vehicles. Namely, a vehicle is detected when a vehicle is superimposed on the processing region. The processing time is shortened and the measurement precision raised by setting the processing region.

SUMMARY OF INVENTION

Technical Problem

However, setting of the processing region is performed manually by a user when a system, such as a monitoring camera, is being installed. However, the characteristics of the processing region (the position, size, and the like) suffer from variation according to the skill of the user (for example, their understanding of the system characteristics). The characteristics of the processing region have a large influence on the measurement precision. Thus in technology hitherto, there is variation in the characteristics of the processing region according to the skill of the user, and as a result there is the problem of variation in the measurement precision. Technology is accordingly demanded that is capable of stabilizing the measurement precision of traffic volume.

Thus in consideration of the above problems, an object of the present invention is to provide a novel and improved data processing apparatus, data processing method, and program capable of stabilizing measurement precision of traffic volume.

Solution to Problem

In order to solve the above problem, an aspect of the present invention provides a data processing apparatus, including an image acquisition section that acquires a captured image depicting a road along which vehicles pass, a calibration section that computes a road parameter for converting coordinates in the captured image to coordinates in real space based on the captured image and road data related to the road, a vehicle lane region detection section that detects a vehicle lane region in the captured image based on the captured image and the road parameter, and a processing region setting section that, based on the vehicle lane region, sets a processing region in the vehicle lane region for detecting a vehicle passing.

The processing region setting section may set the processing region to an end portion at the nearside of the vehicle lane region.

Moreover, the processing region setting section may dispose the entire nearside end portion of the processing region within the captured image.

Moreover, a processing region adjustment section may be further included that adjusts the processing region based on a blocking object that blocks a portion of the vehicle lane region.

Moreover, the processing region adjustment section may set the processing region to a position avoiding the blocking object.

Moreover, the processing region adjustment section may dispose the processing region at a nearside end portion of a region to the far side of the blocking object.

Moreover, when the blocking object blocks a portion of the processing region, the processing region adjustment section may mask a portion of the processing region blocked by the blocking object.

Moreover, the processing region adjustment section may determine a size of a masking portion that masks the processing region and a position of the processing region based on an amount of decrease in detection precision due to the size of the masking portion and based on an amount of decrease in detection precision due to the position of the processing region.

Moreover, the processing region adjustment section may determine a size of the masking portion that masks the processing region and the position of the processing region such that a value of the sum of the amount of decrease in detection precision due to the size of the masking portion and the amount of decrease in detection precision due to the position of the processing region is a minimum.

Moreover, there may be plural of the vehicle lane regions present, and the processing region adjustment section may set the processing region of a vehicle lane region not blocked by the blocking object based on the processing region of a vehicle lane region blocked by the blocking object.

Moreover, the processing region setting section may set a boundary portion between the vehicle lane region and a road side strip region as a two wheeled vehicle detection processing region.

Moreover, the processing region setting section may set a processing region for vehicles other than two wheeled vehicles at a position avoiding the two wheeled vehicle detection processing region.

Moreover, the processing region setting section may adjust the processing region based on user operation.

Moreover, the vehicle lane region detection section may detect a vehicle lane region in the captured image based on user operation.

Another aspect of the present invention provides a data processing method including a step of acquiring a captured image depicting a road along which vehicles pass, a step of computing a road parameter for converting coordinates in the captured image to coordinates in real space based on the captured image and road data related to the road, a step of detecting a vehicle lane region in the captured image based on the captured image and the road parameter, and a step of, based on the vehicle lane region, setting a processing region in the vehicle lane region for detecting a passing vehicle.

Yet another aspect of the present invention provides a program that causes a computer to implement an image acquisition function that acquires a captured image depicting a road along which vehicles pass, a calibration function that computes a road parameter for converting coordinates in the captured image to coordinates in real space based on the captured image and road data related to the road, a vehicle lane detection function that detects a vehicle lane region in the captured image based on the captured image and the road parameter, and a processing region setting function that, based on the vehicle lane region, sets a processing region in the vehicle lane region for detecting a vehicle passing.

Advantageous Effects of Invention

As explained above, according to the present invention, the processing region is set automatically, enabling an appropriate processing region to be set irrespective of the skill of a user. The data processing apparatus is thereby capable of stabilizing the measurement precision of traffic volume, irrespective of the skill of the user.

BRIEF DESCRIPTION OF DRAWINGS

FIG. 12 is an explanatory diagram illustrating an example of a configuration of a database.

DESCRIPTION OF EMBODIMENTS

Figure 1:
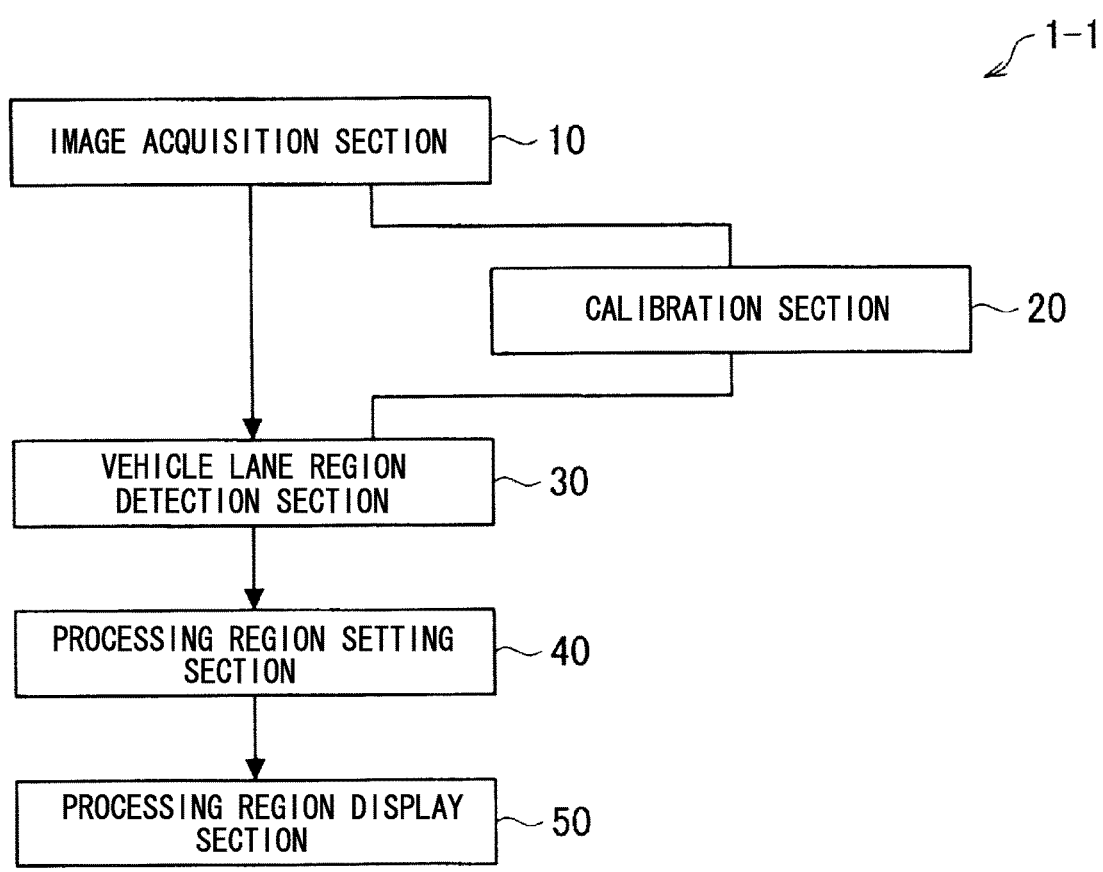
FIG. 1 is a block diagram illustrating a configuration of a data processing apparatus according to a first exemplary embodiment of the present invention.

Detailed explanation follows regarding preferable exemplary embodiments of the present invention, with reference to the appended drawings. In the present specification and drawings, configuration elements that essentially have the same functional configuration are appended with the same reference numerals, and duplicate explanation will be omitted thereof.

1. First Exemplary Embodiment

Data Processing Apparatus Configuration

Explanation first follows regarding a configuration of a data processing apparatus 1-1 according to a first exemplary embodiment, based on the FIG. 1 etc. The data processing apparatus 1-1 includes an image acquisition section 10, a calibration section 20, a vehicle lane region detection section 30, a processing region setting (computation) section 40, and a processing region display section 50. The data processing apparatus 1-1 has a hardware configuration of a CPU, ROM, RAM, hard disk, display, various input devices (such as a keyboard and a mouse), and the like. Programs to implement the image acquisition section 10, the calibration section 20, the vehicle lane region detection section 30, the processing region setting section 40, and the processing region display section 50 on the data processing apparatus 1-1 are stored in the ROM. The programs stored in the ROM are read and then executed by the CPU. The image acquisition section 10, the calibration section 20, the vehicle lane region detection section 30, the processing region setting section 40, and the processing region display section 50 are accordingly implemented by this hardware configuration.

Image Acquisition Section

Figure 6:
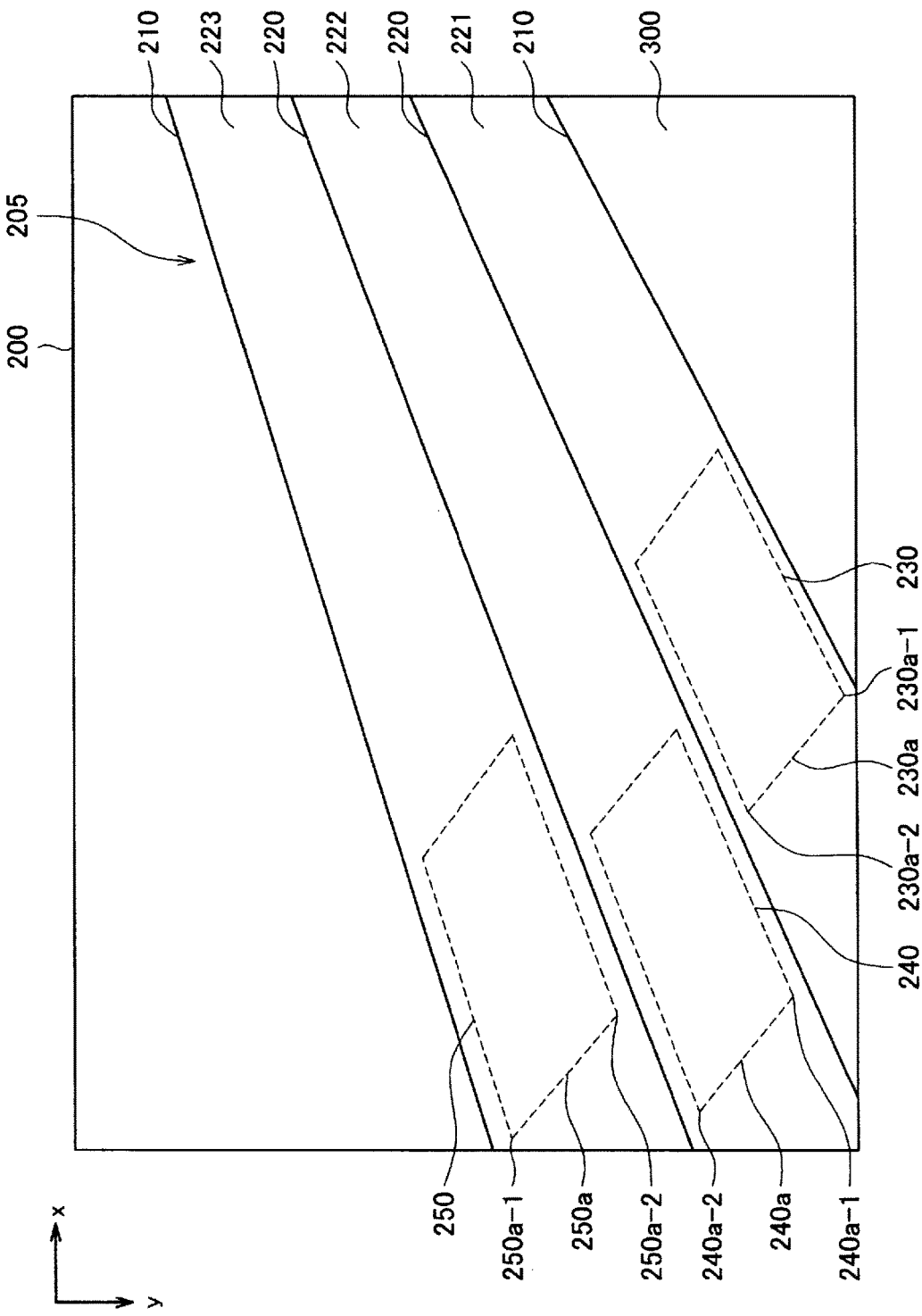
FIG. 6 is an explanatory diagram illustrating a setting example of a processing region in the first exemplary embodiment.

The image acquisition section 10 acquires a captured image from an image capture device, not illustrated in the drawings, and outputs the captured image to the calibration section 20, the vehicle lane region detection section 30, the processing region setting section 40, and the processing region display section 50. The image capture device here is installed at a position higher than the ground surface at the roadside. The image capture device captures an image of a road on which vehicles (four wheeled vehicles, two wheeled vehicles, and the like) travel. The image capture device thereby acquires a captured image depicting the road. The image capture device outputs the acquired captured image to the image acquisition section 10. An example of a captured image is illustrated in FIG. 6. FIG. 6 illustrates a captured image 200, serving as an example of a captured image. A road region 205 is depicted in the captured image 200. The road region 205 includes plural vehicle lane regions 221 to 223. A road side strip region 300 is depicted at the side of the road region 205. The plural vehicle lane regions 221 to 223 include a first lane, a second lane, and a third lane, in sequence from the side nearest to the road side strip region 300. As described later, processing regions 230 to 250 are set in each of the respective vehicle lane regions 221 to 223. In the captured image, x and y axes are set with the across direction axis as the x axis, and the height direction axis as the y axis. Each of the pixels configuring the captured image have xy coordinates and a pixel value (such as brightness).

Calibration Section

The calibration section 20 calibrates for the captured image based on the captured image, and road data input by a user. Examples of road data include the straight lines at the two sides of the road region, a known distance between two objects depicted in the captured image, and various camera parameters. Camera parameters are various data related to the image capture position, and examples thereof include the installation position, the installation angle (the angle formed between the optical axis and the ground surface), and the CCD size of the image capture device.

Methods for a user to input road data include the following methods. Namely, the processing region display section 50 displays a captured image. In response, a user uses a mouse to specify straight lines at the two sides of the road region. For example, say the processing region display section 50 displays the captured image 200 of FIG. 6. The user then operates the mouse to specify straight lines 210 configuring the two edges of the road region 205. A user also specifies 2 objects within the captured image using a mouse or the like, then inputs the distance in real space between the 2 objects using the keyboard. A user also inputs camera parameters using a keyboard.

The calibration section 20 computes a road parameter by calibration of the captured image. The road parameter in this example is an equation for converting two dimensional coordinates in the captured image into three dimensional coordinate in real space. There is no particular limitation to the specific method of calibration. For example, calibration may be performed with the method described in Patent Document 1. The calibration section 20 outputs calibration data including the road parameter and road data to the vehicle lane region detection section 30.

Vehicle Lane Region Detection Section

The vehicle lane region detection section 30 detects vehicle lane regions in the captured image based on the captured image and calibration data. The specific method for detecting vehicle lane regions is not particularly limited. For example, the vehicle lane region detection section 30 detects vehicle lane regions using a method described in JP-A No. 2004-240636. More specifically, the vehicle lane region detection section 30 identifies a road region based on road data (in particular, the straight lines at the two edges of the road region). The vehicle lane region detection section 30 then detects edge data indicating white lines within the road region. In the example of FIG. 6, edge data exists on straight lines 220. The vehicle lane region detection section 30 generates a histogram of white line edge candidates along the road length direction by projecting the edge data along the road length direction calculated from the road parameter. The vehicle lane region detection section 30 then detects vehicle lane regions based on the histogram.

The vehicle lane region detection section 30 limits vehicle lane candidate regions based on the straight lines at the two edges of the road region, and on an average vehicle lane width (an average value of vehicle lane width in real space, stored in advance in the vehicle lane region detection section 30). The vehicle lane region detection section 30 then detects edge data in the vehicle lane direction lying in the vehicle lane candidate regions (this edge data corresponds to white lines), and the vehicle lane region may be detected by executing straight line detection processing, such as a Hough transformation, on the edge data.

Moreover, when a user has manually specified 1 point on a road region (using a mouse, for example), the vehicle lane region detection section 30 may also detect the vehicle lane region based on this point and the road parameter. The vehicle lane region detection section 30 identifies the number of vehicle lanes and the position of the vehicle lane region based on the detected vehicle lane region. For example, the vehicle lane region detection section 30 detects the vehicle lane regions 221 to 223 in the captured image 200 illustrated in FIG. 6, and identifies the number of vehicle lanes as 3. The vehicle lane region detection section 30 outputs the vehicle lane region to the processing region setting section 40.

Processing Region Setting Section

The processing region setting section 40 sets a processing region on the vehicle lane region based on the captured image and the vehicle lane region. The processing region is a region where passing of vehicles can be detected. Namely, passing vehicles are detected from the passing of vehicles through the processing region. Passing vehicle may be performed by another apparatus other than the data processing apparatus 1-1, and passing vehicle detection may be performed in the data processing apparatus 1-1.

There is no particular limitation to the basis for setting the processing region. In the first exemplary embodiment, the processing region setting section 40 sets the processing region as the nearside end portion of the vehicle lane region. The "nearside end portion" is the end portion with the largest y coordinate out of the two length direction end portions of the vehicle lane region (disposed furthest to the lower side in FIG. 6). In other words, in real space the "nearside end portion" is present positioned nearer to the image capture device than the "far side end portion".

Explanation next follows regarding a specific example of setting, based on FIG. 6. The processing region setting section 40 sets the processing regions 230 to 250 in the vehicle lane regions 221 to 223 respectively. The processing region 230 has a width substantially the same as the width of the vehicle lane region 221. Moreover, one vertex 230a-1 on the end portion 230a at the nearside of the processing region 230 is disposed at an end portion of the captured image 200. The other vertex 230a-2 extends out from the one vertex 230a-1 in the vehicle lane region 221 width direction. The nearside end portion 230a of the processing region 230 is thus disposed entirely within the captured image 200. The length of the processing region 230 is preferably the average length of a vehicle (an arithmetic average value of the lengths of busses, cars, trucks etc.) or longer. The length of the processing region 230 is preferably as long as possible from the viewpoint of preventing a vehicle on the far side of the processing region exiting from the far side of the processing region (namely to outside of the captured image) during 1 frame. However, there is the likelihood of detrimental noise in the processing region if the length is too long. The processing region setting section 40 determines the length in consideration of such factors. The length of the processing region 230 may, for example, be about 10 m in real space.

The processing regions 240, 250 are set in a similar manner. Namely, one vertex 240a-2 on the nearside end portion 240a of the processing region 240 is disposed at an end portion of the captured image 200, and the other vertex 240a-1 extends out from the one vertex 240a-2 in the vehicle lane region 222 width direction. One vertex 250a-1 of the nearside end portion 250a of the processing region 250 is disposed at an end portion of the captured image 200, and the other vertex 250a-2 extends out from the one vertex 250a-1 in the vehicle lane region 223 width direction. The lengths of the processing regions 240, 250 are determined similarly to the processing region 230.

In this manner, in the first exemplary embodiment the processing region setting section 40 sets the processing regions at the nearside end portions of the lane regions. This is due to the following reason. Namely, when a vehicle in the captured image has reached the most nearside of the vehicle lane regions, there is more likelihood that overlap with a following vehicle has been eliminated. Namely, errors in detection are less likely to occur. The processing region setting section 40 accordingly sets the processing regions to the nearside end portions of the vehicle lane regions. The processing region setting section 40 outputs processing region data related to processing regions to the processing region display section 50, and to a device for detecting passing vehicles. As described below, if a user has input data relating to the position etc. of the processing region, the processing region setting section 40 corrects the position, size, and the like of the processing region based on this data.

Processing Region Display Section

The processing region display section 50 displays the processing regions superimposed on the captured image.

The processing region display section 50 thereby prompts a user to confirm whether or not there are any obvious mistakes in the position, size, or the like of the processing regions. When there is an obvious mistake in the position, size, or the like of the processing regions (for example, a processing region straddling vehicle lanes, a processing region that spills outside of the vehicle lane region by a large amount, etc.), the user inputs the correct position, size, or the like using an input device, such as a mouse.

Modified Example of Processing Region

Figure 7:
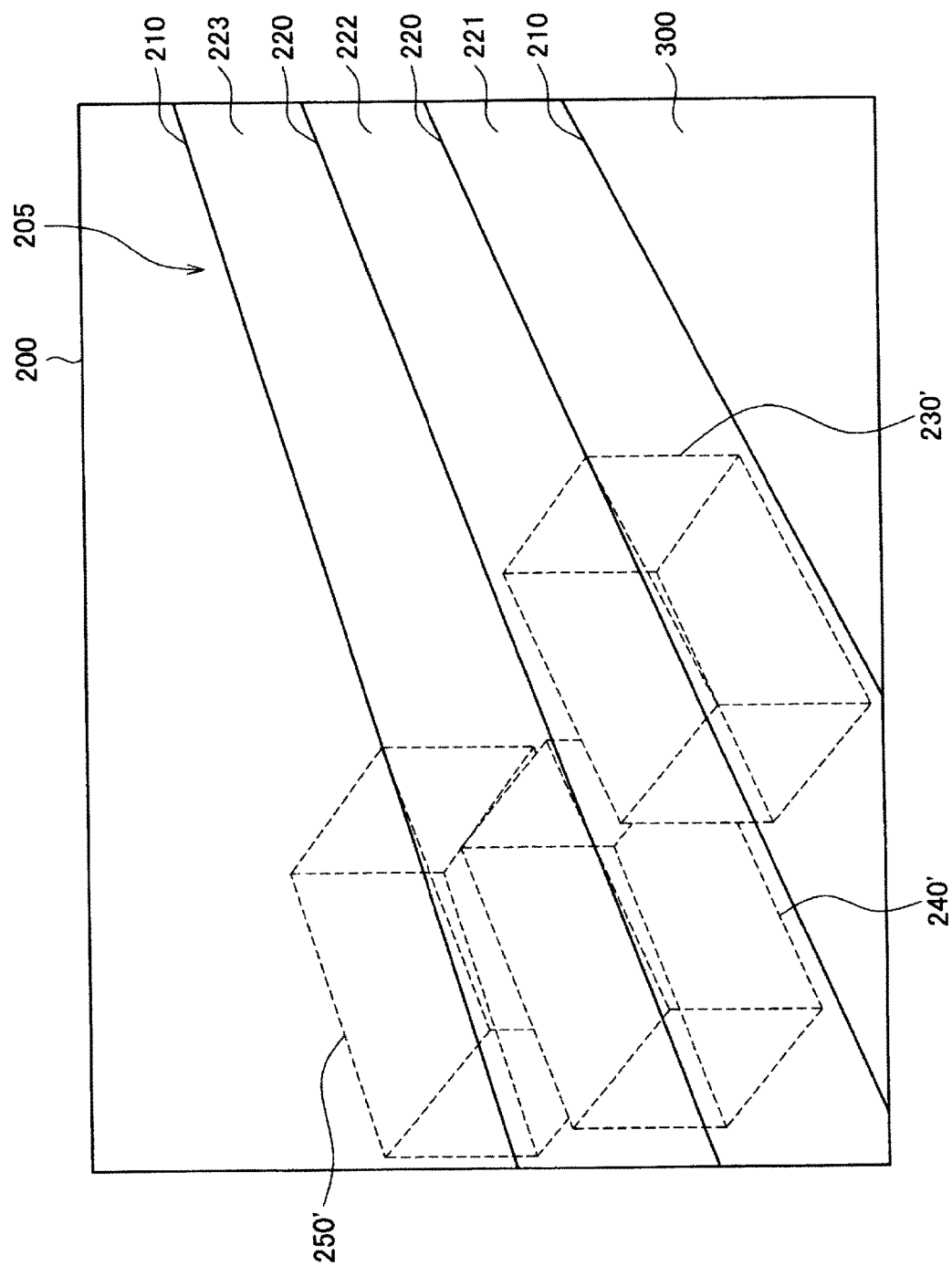
FIG. 7 is an explanatory diagram illustrating a setting example of a processing region in the first exemplary embodiment.

In FIG. 6, the processing regions are flat planes, however the processing regions may be three dimensional, as illustrated in FIG. 7. In the example of FIG. 7, three dimensional processing regions 230' to 250' are set. The processing region setting section 40 may set the processing regions as flat planes or three dimensional objects. However, the processing region setting section 40 makes the processing regions three dimensional when, for example, a device for detecting passing vehicles also detects the size of vehicles. However, the processing region setting section 40 may set the processing regions to flat planes when a device for detecting passing vehicles only detects the passing of vehicles.

Sequence of Processing by Data Processing Apparatus

Figure 4:
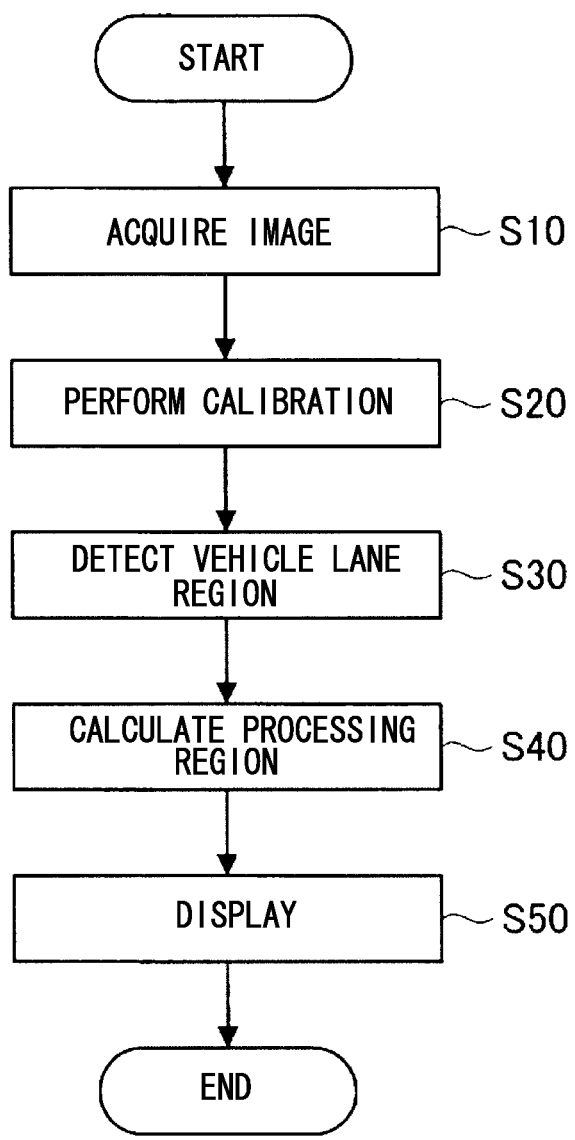
FIG. 4 is flowchart illustrating a sequence of processing by a data processing apparatus according to the first exemplary embodiment of the present invention.

Explanation next follows regarding a sequence of processing performed by the data processing apparatus 1-1, following the flowchart illustrated in FIG. 4.

At step S10, the image acquisition section 10 acquires a captured image from a non-illustrated image capture device, and outputs the captured image to the calibration section 20, the vehicle lane region detection section 30, the processing region setting section 40, and the processing region display section 50.

At step S20, the calibration section 20 performs calibration of the captured image based on the captured image and road data input by a user. The calibration section 20 thereby computes a road parameter. The road parameter in this example is an equation for converting two dimensional coordinates in the captured image into three dimensional coordinate in real space. The calibration section 20 outputs calibration data including the road parameter and the road data to the vehicle lane region detection section 30.

At step S30, the vehicle lane region detection section 30 detects vehicle lane regions in the captured image based on the captured image and the calibration data. The vehicle lane region detection section 30 identifies the number of vehicle lanes and the position of the vehicle lane region based on the detected vehicle lane region. The vehicle lane region detection section 30 outputs the vehicle lane region to the processing region setting section 40.

At step S40, the processing region setting section 40 sets processing regions on the vehicle lane regions based on the captured image and the vehicle lane regions. In the first exemplary embodiment, the processing region setting section 40 sets the processing region at the nearside end portions of the vehicle lane region. The end portion of the processing region at the nearside of the vehicle lane region is disposed entirely within the captured image. The processing region setting section 40 outputs processing region data related to the processing region to the processing region display section 50 and to a device that detects passing vehicles.

At step S50, the processing region display section 50 displays the processing regions superimposed on the captured image. The processing region display section 50 thereby prompts a user to confirm whether or not there is an obvious mistake in the processing regions. When there is an obvious mistake in the position, size, or the like of the processing regions, the user inputs the correct position, size, or the like using an input device, such as a mouse. When the user has inputs data related to the position or the like of the processing region, the processing region setting section 40 corrects the position, size, and the like of the processing region based on this data. The processing region setting section 40 outputs processing region data related to the corrected processing region to the processing region display section 50, and a device for detecting passing vehicles. The data processing apparatus 1-1 then ends the present processing.

In this manner, in the first exemplary embodiment, the data processing apparatus 1-1 automatically sets the processing region, enabling appropriate processing regions to be set, irrespective of user skill. The data processing apparatus 1-1 is thereby able to stabilize the calculation precision of traffic volume, irrespective of user skill.

Moreover, the data processing apparatus 1-1 sets the processing region at the nearside end portion of the vehicle lane region, enabling a reduction in the likelihood of errors due to overlap of vehicle regions.

Moreover, in the data processing apparatus 1-1, all of the nearside end portions of the processing regions are disposed within the captured image, enabling omission of parts of the processing regions to be prevented, and consequently enabling an improvement in the detection precision of passing vehicles.

Moreover, the data processing apparatus 1-1 is capable of setting a more appropriate processing region due to adjusting the processing region based on user operation.

2. Second Exemplary Embodiment

Data Processing Apparatus Configuration

Figure 2:
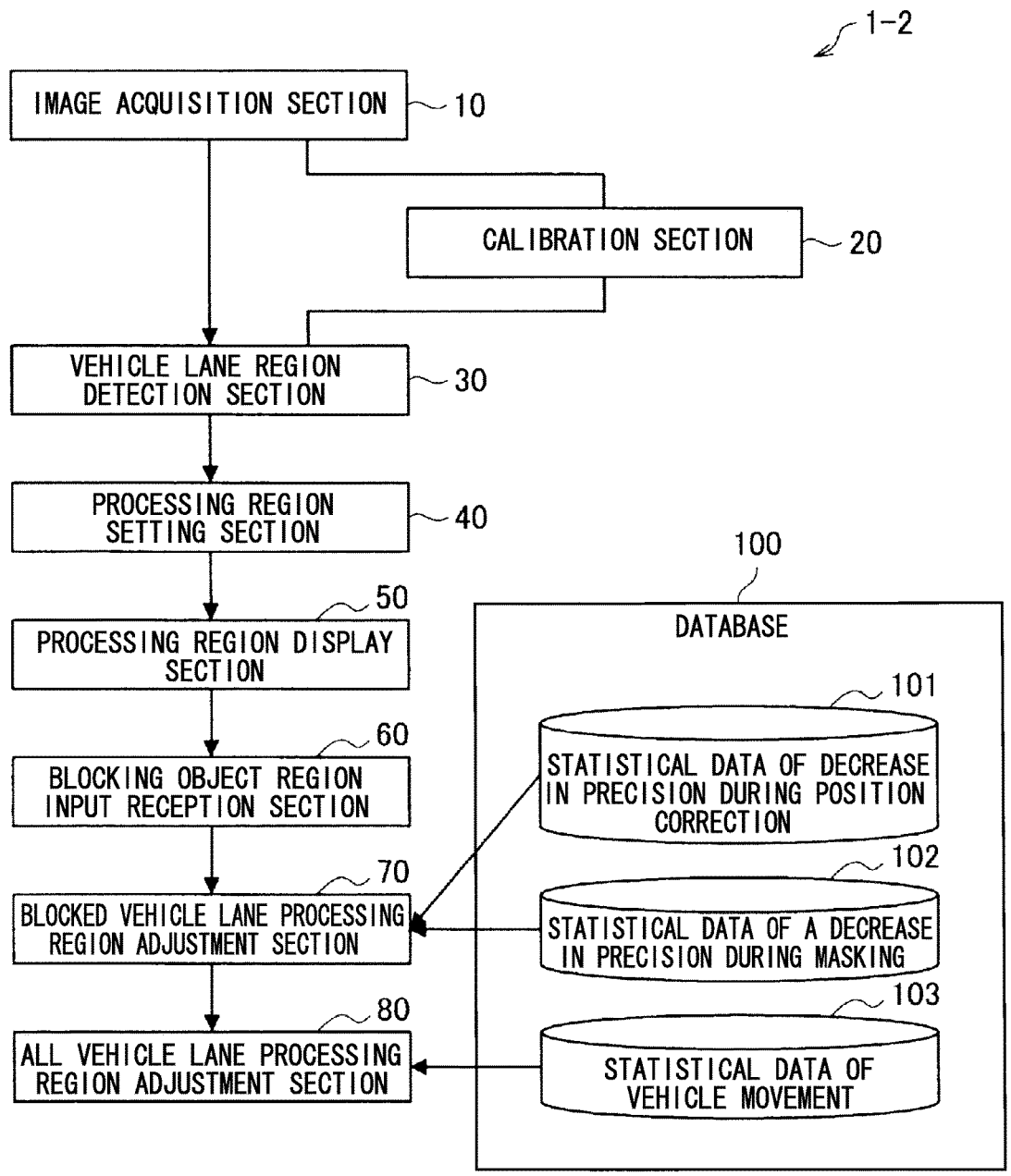
FIG. 2 is a block diagram illustrating a configuration of a data processing apparatus according to a second exemplary embodiment of the present invention.

Explanation next follows regarding a second exemplary embodiment of the present invention. Explanation first follows regarding a configuration of a data processing apparatus 1-2 according to the second exemplary embodiment, with reference to FIG. 2 etc. The data processing apparatus 1-2 is the data processing apparatus 1-1, to which has been added a blocking object region input reception section 60, a blocked vehicle lane processing region adjustment section 70, an all vehicle lane processing region adjustment section 80, and a database 100. The blocked vehicle lane processing region adjustment section 70 and the all vehicle lane processing region adjustment section 80 configure a processing region adjustment section. The data processing apparatus 1-2 basically performs processing to set a processing region at a position avoiding blocking objects.

Blocking Object Region Input Reception Section

Figure 8:
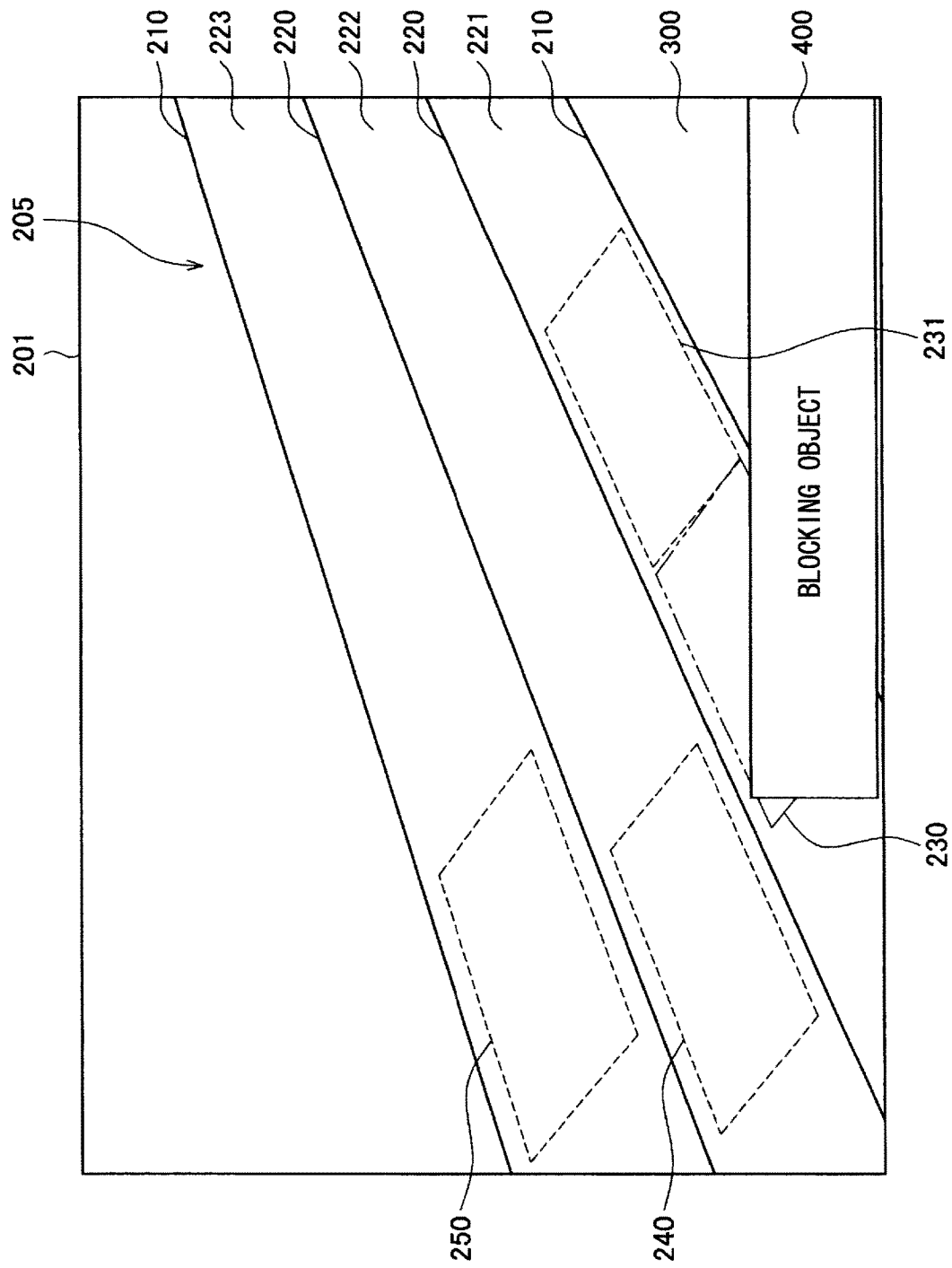
FIG. 8 is an explanatory diagram illustrating a setting example of a processing region in the second exemplary embodiment.

The blocking object region input reception section 60 receives a blocking object specification operation by a user. Namely, when there is a blocking object present between the image capture device and the road (for example a roadside tree, a traffic signal, a sign, a placard or the like), there is a possibility of a vehicle lane region in the captured image being blocked by the blocking object. Such an example is illustrated in FIG. 8. In the example in FIG. 8, a blocking object 400 is depicted on a captured image 201, and the blocking object 400 blocks a portion of the vehicle lane region 221. The captured image 201 is the captured image 200, with the blocking object 400 added. In particular, in this example, the nearside end portion of the vehicle lane region 221 is blocked by the blocking object. Therefore, the processing region 230 is also blocked. There is, in such cases, the possibility of a reduction in the precision of detection of passing vehicles, particularly in the processing region 230.

Thus a user specifies the blocking object with reference to the captured image displayed by the processing region display section 50. There are no particular limitations to the method of specifying the blocking object, and examples thereof include the following methods. (1) a user manipulates a mouse such that a mouse pointer traces over the edges of a blocking object. (2) a user manipulates a mouse such that the blocking object is enclosed by a rectangle (or another freely selected shape). (3) a user specifies one point within the blocking object. In such cases, the blocking object region input reception section 60 identifies, as the blocking object, a contiguous region with pixel values similar to the point specified by the user. The blocking object region input reception section 60 outputs the blocking object to the blocked vehicle lane processing region adjustment section 70.

Blocked Vehicle Lane Processing Region Adjustment Section

The blocked vehicle lane processing region adjustment section 70 adjusts the processing region based on the blocking object. Three methods are given below as examples of such adjustment methods.

(1) Setting a processing region at a position avoiding the blocking object. More specifically, setting the processing region at a nearside end portion in a region to the far side of the blocking object.

A specific example is explained, with reference to FIG. 8. In the example illustrated in FIG. 8, the processing region 230 is blocked by the blocking object 400 as described above. The blocked vehicle lane processing region adjustment section 70 then moves the processing region 230 to the nearside end portions of a region to the far side of the blocking object 400, thereby newly setting the processing region 231. This thereby enables the detection precision of passing vehicles to be raised while preventing influence from the blocking object.

(2) Masking a portion blocked by the blocking object in the processing region. Such processing is also capable of raising the detection precision of passing vehicles while preventing influence from the blocking object.

(3) Determining the size of a masked portion and the position of the processing region based on an amount of decrease in detection precision due to the size of the masked portion, which masks the processing region, and based on an amount of decrease in detection precision due to the position of the processing region.

In this processing, statistical data 101 of a decrease in precision during position correction, and statistical data 102 of a decrease in precision during masking, is employed from out of data stored in the database 100. The database 100 stores the statistical data 101 of a decrease in precision during position correction, the statistical data 102 of a decrease in precision during masking, and statistical data 103 of vehicle movement.

An example of the statistical data 101 is illustrated in FIG. 12. The statistical data 101 indicates a correspondence relationship between the sector of the vehicle lane region (lane), the distance from an initial position, and an amount of decrease in precision. Letters of the alphabet are used to denote the sectors of the vehicle lane regions. There is obviously no limitation to the data illustrating sectors. The earlier in the alphabet, the nearer the lane indicated by the letter in the alphabet is to the road side strip. The initial position indicates the position set by the processing region setting section 40 (the position at the nearside end portions of the processing region). The distance from the initial position indicates the distance between the nearside end portions of the processing region set by the blocked vehicle lane processing region adjustment section 70, and the initial position. Moreover, for example, "0 m to 2 m" means 0 m or greater, but less than 2 m. The amount of decrease in precision indicates a relative amount of decrease taking the detection precision at the initial position to be 100%.

The detection precision is computed (simulated) in the following manner. Namely, a cuboid is disposed so as to be equivalent to a vehicle in real space corresponding to the processing region. A cuboid is also similarly disposed in real space from 7 m to 8 m to the rear thereof. Here, 7 m to 8 m is a value assumed for the inter-vehicle separation. Thus another value may be employed for this value. How much overlap these cuboids have in captured images captured by the image capture device is then computed. The amount of decrease in precision is then computed based on the amount of overlap, and the performance of the device detecting passing vehicles. As illustrated in FIG. 12, the decrease in precision gets larger as the distance from the initial position increases. This is because the amount of overlap of vehicles increases as the distance from the initial position increases. The greater the distance between the vehicle lane and the road side strip, the more the decrease in precision is suppressed. This is because the greater the distance between the image capture device and the vehicle lane, the more the amount of overlap of vehicles in the captured image is suppressed.

The statistical data 102 is configured similarly to the statistical data 101. The statistical data 102 indicates correspondence relationships between a sector of vehicle lane region (lane), the size of mask portion, and the amount of decrease in precision. The amount of decrease in precision indicates the relative amount of decrease, taking the detection precision when the processing region is not masked (more specifically when the processing region is completely unobstructed) as 100%.

The amount of decrease in precision due to the position of the processing region and the size of the mask portion differs depending on the content of the calibration, or more specifically on the road parameter. The database 100 therefore stores the statistical data 101, 102 for each of the road parameters. The blocked vehicle lane processing region adjustment section 70 selects the statistical data 101, 102 based on the road parameters computed by the calibration section 20.

The blocked vehicle lane processing region adjustment section 70 then determines the size of the mask portion and the position of the processing region to give a minimum value of the sum of the amount of decrease in detection precision due to the size of the mask portion masking the processing region (namely, the amount of decrease in precision represented by the statistical data 102), and the amount of decrease in detection precision due to the position of the processing region (namely the amount of decrease in precision represented by the statistical data 101). Namely, shifting the position of the processing region changes the size of the blocked portion caused by the blocking object (namely changes the size of the portion requiring masking). The blocked vehicle lane processing region adjustment section 70 computes the total value of the amount of decrease in precision while shifting the position of the processing region, and searches for the position where this total is at a minimum. The blocked vehicle lane processing region adjustment section 70 adjusts the size of the mask portion and the position of the processing region to the determined values.

The blocked vehicle lane processing region adjustment section 70 may perform any of the above processing (1) to (3). The blocked vehicle lane processing region adjustment section 70 outputs processing region data relating to the post-adjustment processing region to the all vehicle lane processing region adjustment section 80. The blocked vehicle lane processing region adjustment section 70 may adjust the processing region by processing other than the processing described above. The blocked vehicle lane processing region adjustment section 70 may finally adjust the processing region such that the detection precision is raised while minimizing the influence from blocking objects.

All Vehicle Lane Processing Region Adjustment Section

Figure 9:
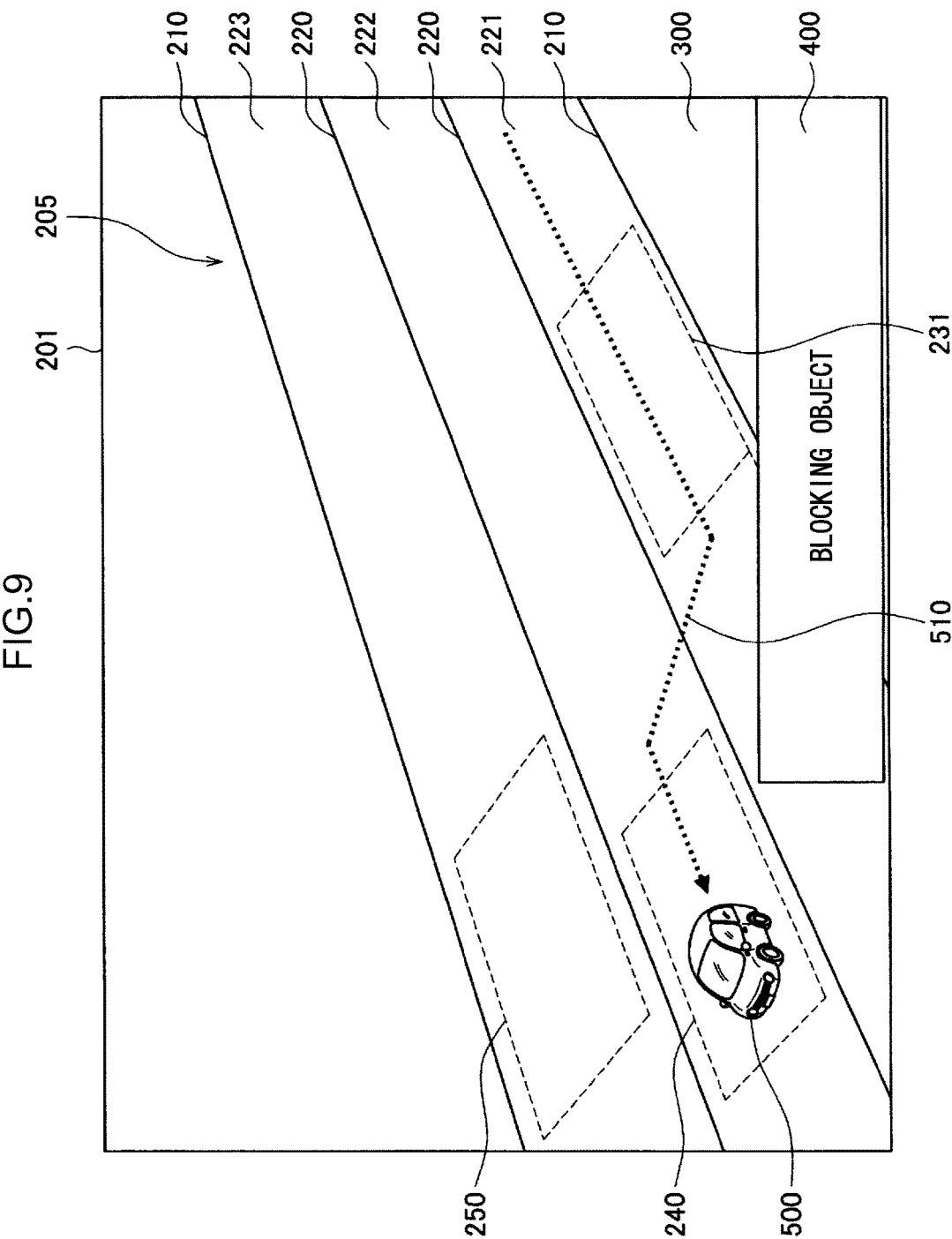
FIG. 9 is an explanatory diagram to explain a problem of double counting of vehicles.

The all vehicle lane processing region adjustment section 80 adjusts the processing region on the vehicle lane region so as not to be blocked by a blocking object. The reason such processing is necessary will be explained with reference to FIG. 9. In this example, the adjustment illustrated in FIG. 8 is performed. As illustrated in FIG. 9, there are cases in which a vehicle 500 changes lane after passing through the processing region 231 in the vehicle lane region 221, and then passes through the processing region 240. The arrow 510 illustrates the movement track of the vehicle 500. In such cases, there is a possibility that the same vehicle 500 is detected in each of the different processing regions 231, 240, namely there is the possibility of double counting. Double counting decreases the detection precision.

Consider a case in which the vehicle 500 does not pass through either of the processing regions 231, 241. For example, the vehicle 500 does not pass through either of the processing regions 231, 241 in a case in which the vehicle 500 moves along the vehicle lane region 222 until just before the processing region 240, then moves over to the vehicle lane region 221. In this case also, the detection precision is decreased. Thus the possibility of double counting occurring and the possibility of a vehicle not passing through either of the processing regions can be decreased by the all vehicle lane processing region adjustment section 80 adjusting the processing regions on the vehicle lane regions so as not to be blocked by a blocking object.

The following are two specific examples of such processing. (1) aligning the nearside end portions of all of the processing regions to the same position. (2) disposing the processing regions at positions as close as possible to the nearside of the vehicle lane region under a condition that a vehicle region only passes through one processing region.

Figure 10:
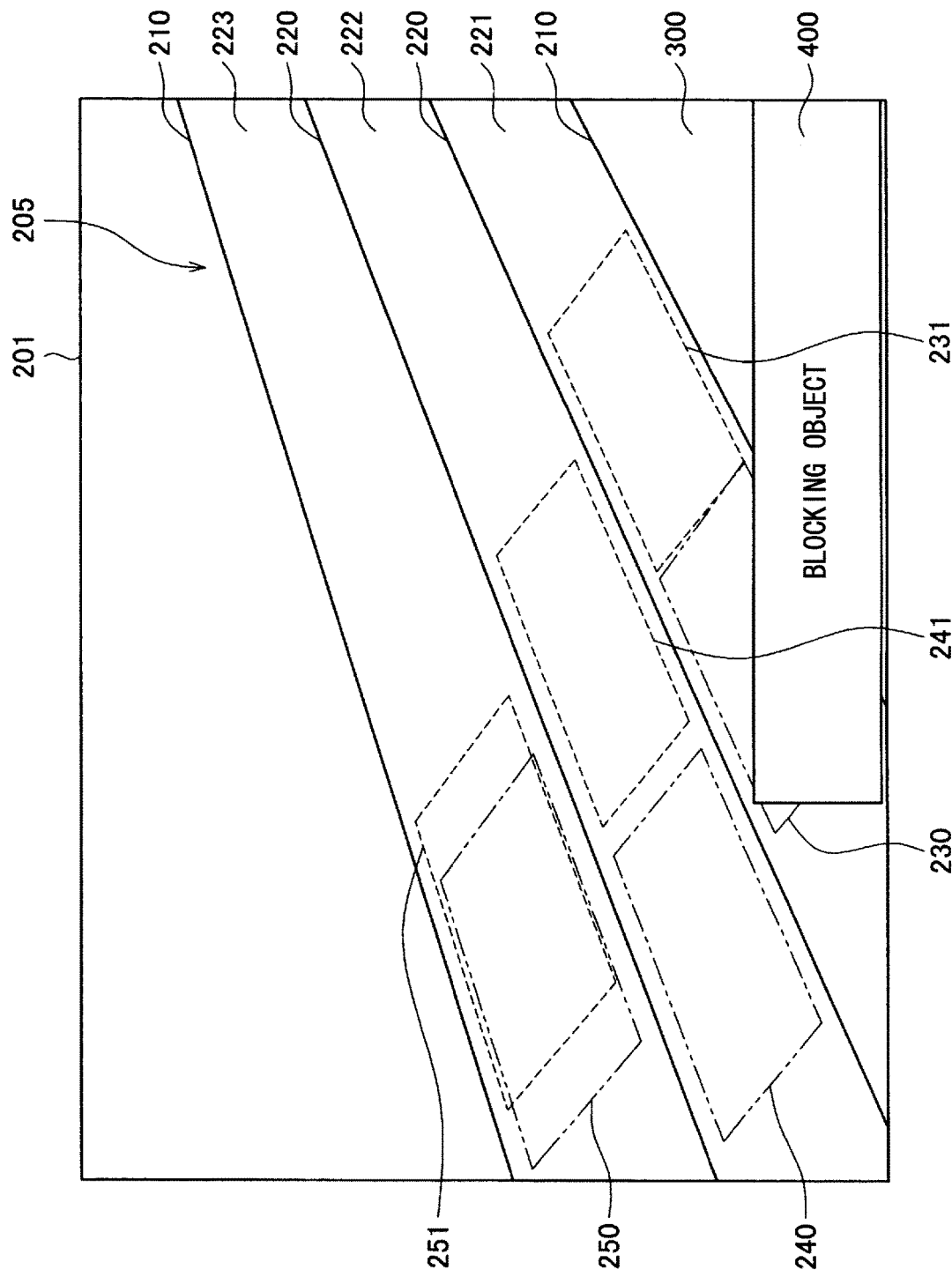
FIG. 10 is an explanatory diagram illustrating a setting example of a processing region in the second exemplary embodiment.

The statistical data 103 is employed in the processing of (2). The statistical data 103 includes data representing a position in each of the vehicle lanes where a vehicle changes lane or the like. Due to this data, the all vehicle lane processing region adjustment section 80 knows the positions in each of the vehicle lanes where vehicles change lane, enabling prediction of whether or not a vehicle region passes through only one processing region by setting the locations for each of the processing regions. A specific example of processing regions adjusted by the processing of (2) is illustrated in FIG. 10. In the example illustrated in FIG. 10, a new processing region 241 is achieved by adjusting the processing region 240, and a new processing region 251 is achieved by adjusting the processing region 250. As illustrated in FIG. 10, the processing regions 231 to 251 are close to each other, reducing the possibility of double counting occurring and reducing the possibility that a vehicle region passes does not pass through any processing region.

The all vehicle lane processing region adjustment section 80 may perform either of the processing (1) or (2). The all vehicle lane processing region adjustment section 80 outputs data relating to all of the post-adjustment processing regions to a device that detects passing vehicles. The all vehicle lane processing region adjustment section 80 may adjust the processing regions using processing other than described above. The all vehicle lane processing region adjustment section 80 may finally adjust the processing regions so that the detection precision is raised while minimizing the influence of blocking objects.

Sequence of Processing by Data Processing Apparatus

Figure 5:
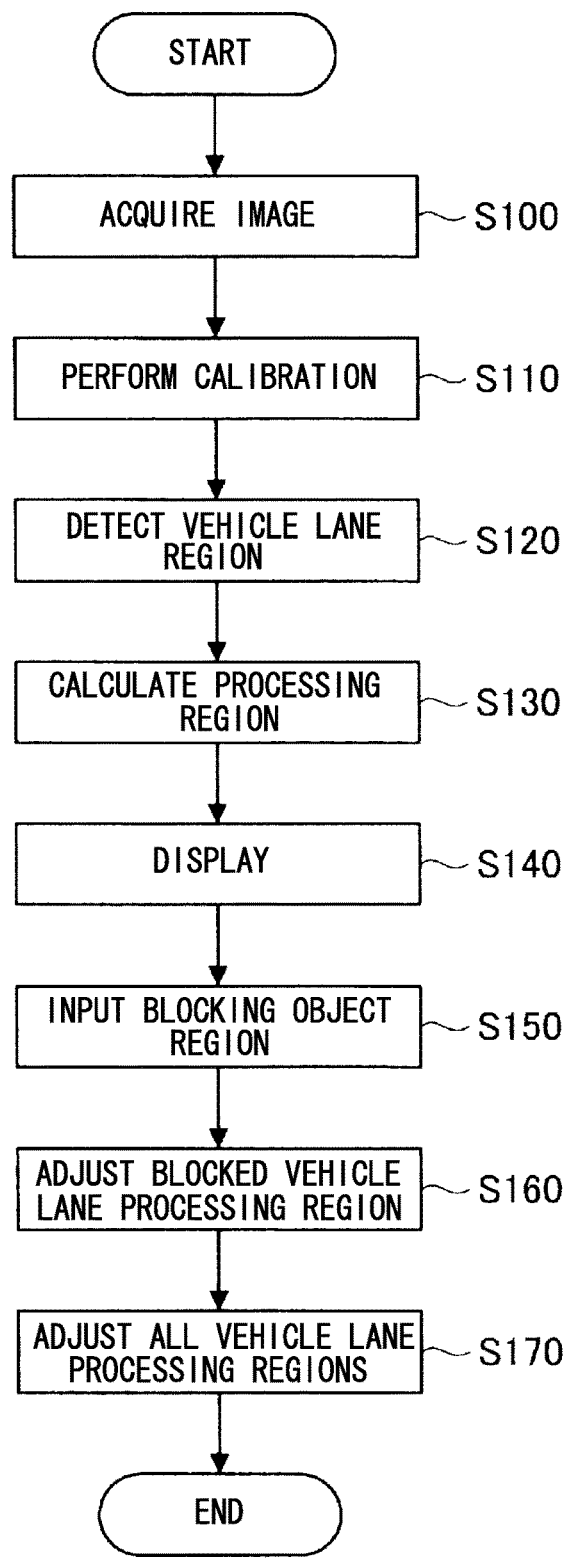
FIG. 5 is a flowchart illustrating a sequence of processing by a data processing apparatus according to the second exemplary embodiment of the present invention.

Explanation next follows regarding a sequence of processing by the data processing apparatus 1-2, following the flowchart illustrated in FIG. 5.

At steps S100 to S140, the data processing apparatus 1-2 performs processing similar to that of steps S10 to S50 illustrated in FIG. 4.

At step S150, the blocking object region input reception section 60 receives a blocking object specification operation by a user. The blocking object region input reception section 60 outputs the blocking object to the blocked vehicle lane processing region adjustment section 70.

At step S160, the blocked vehicle lane processing region adjustment section 70 adjusts the processing region based on the blocking object. More specifically, the blocked vehicle lane processing region adjustment section 70 performs one of the three processing types described above. The blocked vehicle lane processing region adjustment section 70 outputs processing region data related to the post-adjustment processing region to the all vehicle lane processing region adjustment section 80.

At step S170, the all vehicle lane processing region adjustment section 80 adjusts the processing region on the vehicle lane regions not blocked by the blocking object. More specifically, the all vehicle lane processing region adjustment section 80 performs one of the two processing types described above. The all vehicle lane processing region adjustment section 80 outputs data related to all the post-adjustment processing regions to the device for detecting passing vehicles.

The data processing apparatus 1-2 is thereby able to suppress a decrease in detection precision caused by the blocking object by adjusting the processing region based on the blocking object blocking a portion of the vehicle lane region.

Moreover, the data processing apparatus 1-2 is able to suppress a decrease in detection precision caused by the blocking object with greater certainty by setting the processing region at a position avoiding the blocking object.

Moreover, the data processing apparatus 1-2 is able to suppress a decrease in detection precision caused by the blocking object with greater certainty by disposing the processing region at the nearside end portion in a region to the far side of the blocking object.

Moreover, the data processing apparatus 1-2 is able to suppress a decrease in detection precision caused by the blocking object with greater certainty by masking a portion of the processing region blocked by the blocking object when a portion of the processing region is blocked by the blocking object.

Moreover, the data processing apparatus 1-2 determines the size of the mask portion and the position of the processing region based on the amount of decrease in detection precision due to the size of the masking portion masking the processing region, and based on the amount of decrease in detection precision due to the position of the processing region. The data processing apparatus 1-2 is thereby capable of suppressing a decrease in detection precision caused by the blocking object with greater certainty.

The data processing apparatus 1-2 determines the size of the mask portion and the position of the processing region such that the value of the sum of the amount of decrease in detection precision due to the size of the masking portion masking the processing region, and the amount of decrease in detection precision due to the position of the processing region, achieves a minimum. The data processing apparatus 1-2 is accordingly capable of suppressing a decrease in detection precision due to a blocking object with greater certainty.

Moreover, the data processing apparatus 1-2 sets the processing region of vehicle lane regions not blocked by blocking objects based on the processing region of the vehicle lane blocked by the blocking object, and is accordingly capable of suppressing a decrease in detection precision due to a blocking object with greater certainty.

3. Third Exemplary Embodiment

Figure 3:
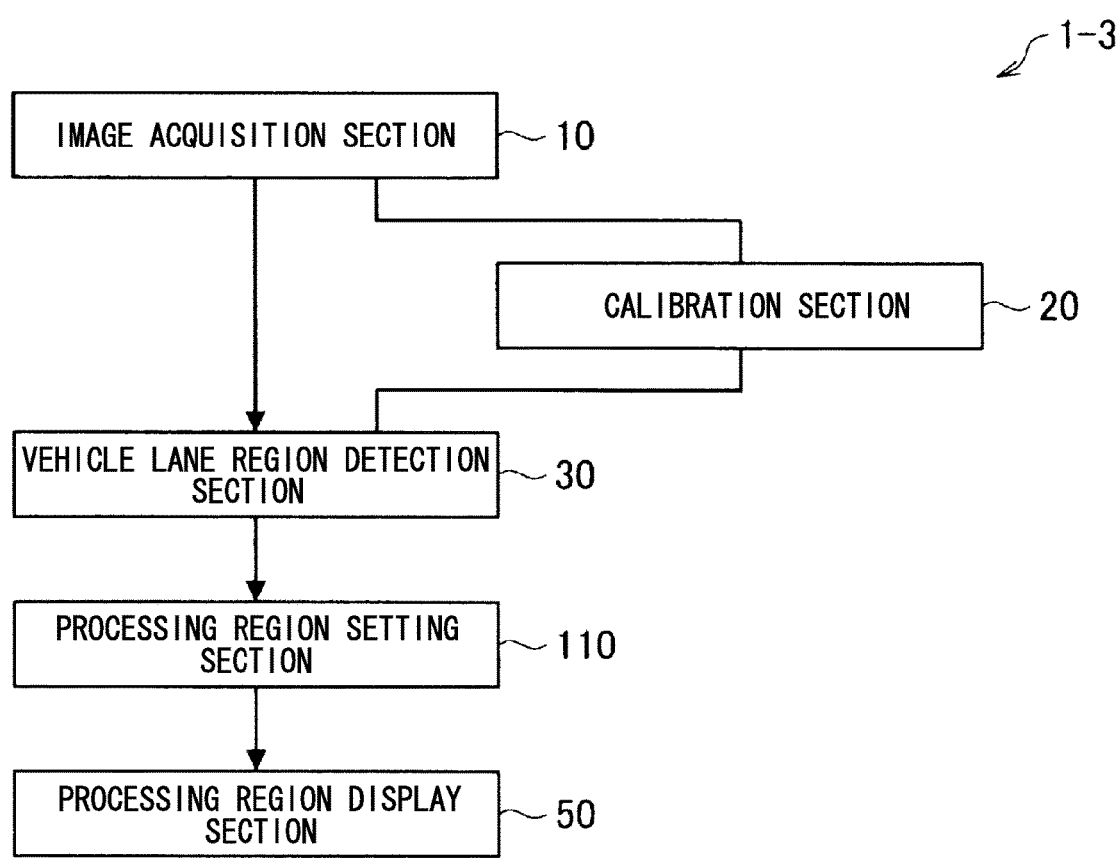
FIG. 3 is a block diagram illustrating a configuration of a data processing apparatus according to a third exemplary embodiment of the present invention.

Explanation next follows regarding a third exemplary embodiment of the present invention. First, explanation follows regarding a configuration of a data processing apparatus 1-3 according to the third exemplary embodiment with reference to FIG. 3. The data processing apparatus 1-3 is achieved by modifying the processing region setting section 40 of the data processing apparatus 1-1 into a processing region setting section 110. In brief, the data processing apparatus 1-3 sets a processing region for a two wheeled vehicle.

Processing Region Setting Section

The processing region setting section 110 sets a boundary portion between the vehicle lane region and the road side strip region as a processing region for a two wheeled vehicle, namely a two wheeled vehicle detection processing region. Examples of two wheeled vehicles include motorbikes, electric bicycles, and bicycles. A two wheeled vehicle often passes in the vicinity of a road side strip, making such setting possible. The processing region setting section 110 sets the position of the processing region of the vehicle lane region adjacent in the image to the road side strip so as to avoid the two wheeled vehicle detection processing region. This is because vehicles other than two wheeled vehicles, such as four wheeled vehicles, pass through while avoiding two wheeled vehicles. More specifically, the processing region setting section 110 may first set the processing region similarly to in the first exemplary embodiment, then set the two wheeled vehicle detection processing region in a portion at the road side strip region side of only the processing region adjacent to the road side strip region.

Figure 11:
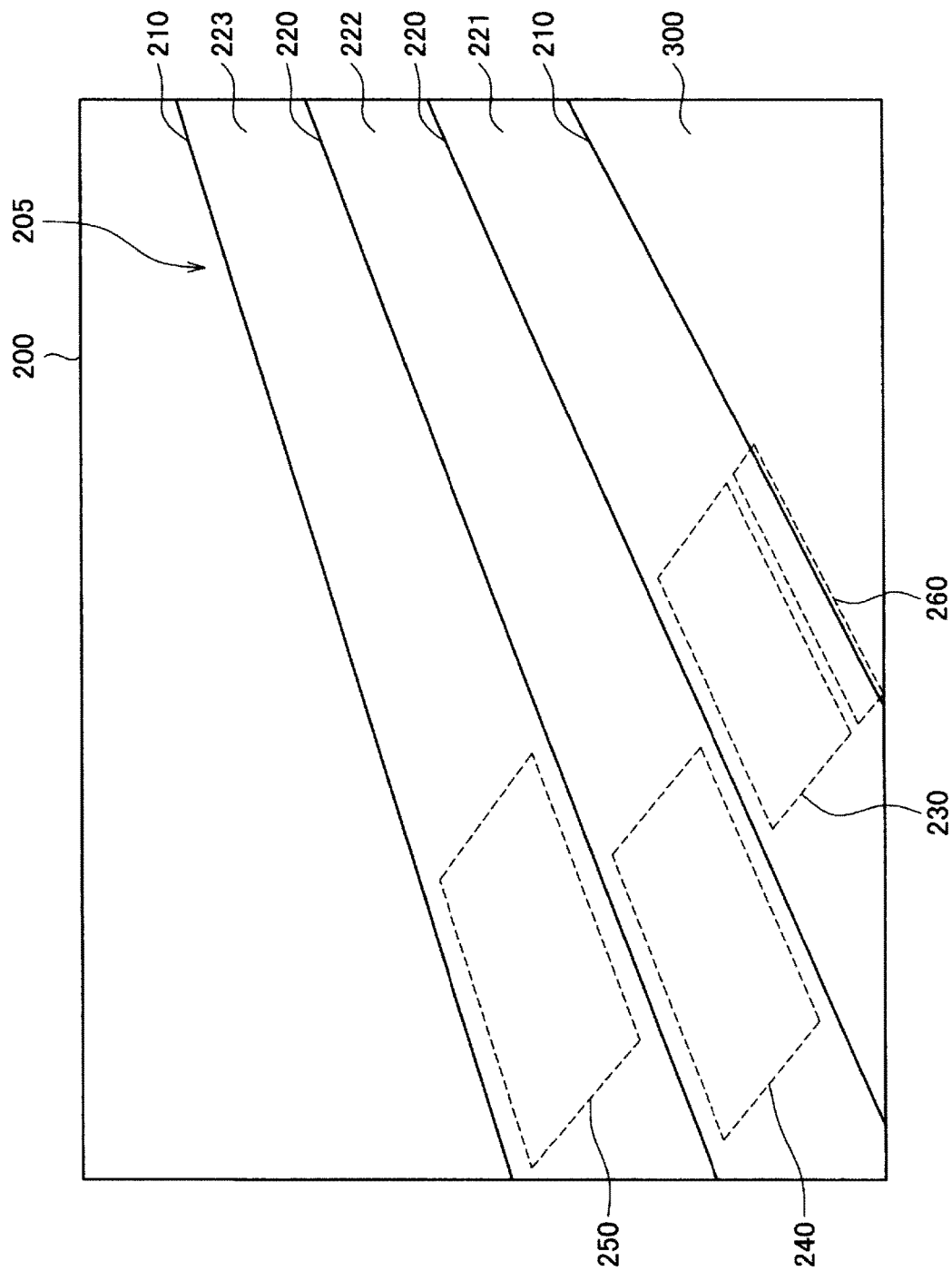
FIG. 11 is an explanatory diagram illustrating a setting example of a processing region in the third exemplary embodiment.

FIG. 11 illustrates a specific example. In this example, the processing region setting section 110 sets a two wheeled vehicle detection processing region 260 at the boundary between the road side strip region 300 and the vehicle lane region 221, and sets a processing region 230 at a position avoiding the two wheeled vehicle detection processing region 260.

The processing region setting section 110 outputs processing region data related to the processing region to the processing region display section 50 and to a device for detecting passing vehicles. When a user has entered data relating the position of the processing region and the like, the processing region setting section 110 corrects the position, size, and the like of the processing regions based on this data.

Sequence of Processing by Data Processing Apparatus

The subsequent sequence of processing by the data processing apparatus 1-3 only differs from the first exemplary embodiment in step S40 illustrated in FIG. 4. Explanation only follows regarding the processing of step S40. At step S40, the processing region setting section 110 sets a boundary portion between the vehicle lane region and the road side strip region as a two wheeled vehicle processing region, namely as a two wheeled vehicle detection processing region. Moreover, the processing region setting section 110 sets the processing region of the vehicle lane region adjacent to the road side strip region at a position to avoid the two wheeled vehicle detection processing region. The processing region setting section 110 outputs processing region data related to the processing region to the processing region display section 50 and a device for detecting passing vehicles.

As described above, in the third exemplary embodiment, the data processing apparatus 1-3 sets a boundary portion between the vehicle lane region and the road side strip region as a two wheeled vehicle detection processing region, enabling two wheeled vehicles to be detected.

Moreover, the data processing apparatus 1-3 sets a processing region for vehicles other than two wheeled vehicles at a position avoiding the two wheeled vehicle detection processing region, thereby enabling the setting of processing regions in consideration of traffic conditions (four wheeled vehicles passing through while avoiding two wheeled vehicles). In other words, misdetection caused by two wheeled vehicles can be suppressed.

Detailed explanation has been given above of preferable embodiments of the present invention, with reference to the appended drawings; however the present invention is not limited thereto. Clearly various modifications and improvements within the range of the technical scope as recited in the patent claims will be obvious to a person of ordinary skill in the technology of the present invention, and obviously these modifications and improvements should be understood to fall within the technical scope of the present invention.

The whole of the disclosure of Japanese Patent Application No. 2012-202273 is incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference patent application, or technical standard was specifically and individually indicated to be incorporated by reference.

The invention claimed is:

1. A data processing apparatus, comprising:
   an image acquisition section that acquires a captured image depicting a road along which vehicles pass;
   a calibration section that computes a road parameter that is an equation for converting two dimensional coordinates in the captured image to three dimensional coordinates in real space based on the captured image and road data related to the road;
   a vehicle lane region detection section that detects a vehicle lane region in the captured image based on the captured image and the road parameter;
   a processing region setting section that, based on the vehicle lane region, sets a processing region in the vehicle lane region for detecting a vehicle passing; and a processing region adjustment section that adjusts the processing region based on a blocking object that blocks a portion of the vehicle lane region;

wherein when the blocking object blocks a portion of the processing region, the processing region adjustment section masks a portion of the processing region blocked by the blocking object and determines a size of a masking portion that masks the processing region and a position of the processing region based on an amount of decrease in detection precision due to the size of the masking portion and based on an amount of decrease in detection precision due to the position of the processing region.

2. The data processing apparatus of claim 1, wherein the processing region setting section sets the processing region to an end portion at a near side of the vehicle lane region.

3. The data processing apparatus of claim 2, wherein the processing region setting section disposes an entire near-side end portion of the processing region within the captured image.

4. The data processing apparatus of claim 1, wherein the processing region adjustment section sets the processing region to a position avoiding the blocking object and disposes the processing region at a near-side end portion of a region to a far side of the blocking object.

5. The data processing apparatus of claim 1, wherein the processing region adjustment section determines a size of the masking portion that masks the processing region and the position of the processing region such that a value of a sum of the amount of decrease in detection precision due to the size of the masking portion and the amount of decrease in detection precision due to the position of the processing region is a minimum.

6. The data processing apparatus of claim 1, wherein:
there is a plurality of the vehicle lane regions present; and
the processing region adjustment section sets at least a portion of a processing region of a vehicle lane region not blocked by the blocking object based on at least the portion of the processing region of the vehicle lane region blocked by the blocking object.

7. The data processing apparatus of claim 1, wherein:
the processing region setting section sets a boundary portion between the vehicle lane region and a road side strip region as a two wheeled vehicle detection processing region.

8. The data processing apparatus of claim 7, wherein:
the processing region setting section sets a processing region for vehicles other than two wheeled vehicles at a position avoiding the two wheeled vehicle detection processing region.

9. The data processing apparatus of claim 1, wherein the processing region setting section adjusts the processing region based on user operation.

10. The data processing apparatus of claim 1, wherein the vehicle lane region detection section detects a vehicle lane region in the captured image based on user operation.

11. A data processing method comprising:
a step of acquiring a captured image depicting a road along which vehicles pass;
a step of computing a road parameter that is an equation for converting two dimensional coordinates in the captured image to three dimensional coordinates in real space based on the captured image and road data related to the road;
a step of detecting a vehicle lane region in the captured image based on the captured image and the road parameter;

a step of, based on the vehicle lane region, setting a processing region in the vehicle lane region for detecting a passing vehicle; and a step of adjusting the processing region based on a blocking object that blocks a portion of the vehicle lane region;

wherein in the adjusting step, when the blocking object blocks a portion of the processing region, the portion in the processing region blocked by the blocking object is masked, and a size of a masking portion that masks the processing region and a position of the processing region are determined based on an amount of decrease in detection precision due to the size of the masking portion and based on an amount of decrease in detection precision due to the position of the processing region.

12. The data processing apparatus of claim 1, wherein the processing region is three dimensional.

13. The data processing method of claim 11, wherein in the setting step, the processing region is set to an end portion at a near side of the vehicle lane region.

14. The data processing method of claim 13, wherein in the setting step, an entire near-side end portion of the processing region is disposed within the captured image.

15. The data processing method of claim 11, wherein
in the adjusting step, the processing region is disposed at a position that avoids the blocking object and is at a near-side end portion of a region to a far side of the blocking object.

16. The data processing method of claim 11, wherein in the adjusting step, a size of the masking portion that masks the processing region and the position of the processing region are determined such that a value of a sum of the amount of decrease in detection precision due to the size of the masking portion and the amount of decrease in detection precision due to the position of the processing region is a minimum.

17. The data processing method of claim 11, wherein
there is a plurality of the vehicle lane regions present, and
the adjusting step includes setting at least a portion of a processing region of a vehicle lane region not blocked by the blocking object based on at least the portion of the processing region of the vehicle lane region blocked by the blocking object.

18. The data processing method of claim 11, wherein
the setting step includes setting a boundary portion between the vehicle lane region and a road side strip region as a two wheeled vehicle detection processing region.

19. The data processing method of claim 18, wherein:
the setting step includes setting a processing region for vehicles other than two wheeled vehicles at a position avoiding the two wheeled vehicle detection processing region.

20. The data processing method of claim 11, wherein the setting step includes adjusting the processing region based on user operation.

21. The data processing method of claim 11, wherein the setting step includes detecting a vehicle lane region in the captured image based on user operation.

22. The data processing method of claim 11, wherein the processing region is three dimensional.

* * * * *